United States Patent
Kambara

(10) Patent No.: US 12,415,456 B2
(45) Date of Patent: Sep. 16, 2025

(54) VEHICLE POSITION IDENTIFICATION APPARATUS, VEHICLE POSITION IDENTIFICATION METHOD, LIGHT DISTRIBUTION CONTROLLER, VEHICLE LAMP SYSTEM

(71) Applicant: Stanley Electric Co., Ltd., Tokyo (JP)

(72) Inventor: Takeshi Kambara, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 77 days.

(21) Appl. No.: 18/286,410

(22) PCT Filed: Mar. 31, 2022

(86) PCT No.: PCT/JP2022/016656
§ 371 (c)(1),
(2) Date: Oct. 11, 2023

(87) PCT Pub. No.: WO2022/220156
PCT Pub. Date: Oct. 20, 2022

(65) Prior Publication Data
US 2024/0116430 A1    Apr. 11, 2024

(30) Foreign Application Priority Data

Apr. 16, 2021 (JP) ................ 2021-069558

(51) Int. Cl.
*B60Q 1/14* (2006.01)
*G06V 20/58* (2022.01)

(52) U.S. Cl.
CPC ............. *B60Q 1/143* (2013.01); *G06V 20/58* (2022.01); *B60Q 2300/41* (2013.01)

(58) Field of Classification Search
CPC ..... B60Q 1/143; B60Q 2300/41; G06V 20/58
(Continued)

(56) References Cited

U.S. PATENT DOCUMENTS 10,449,960 B2 * 10/2019 Keller .................. G06F 18/254
2012/0226412 A1    9/2012 Nakadate
(Continued)

FOREIGN PATENT DOCUMENTS

JP    2016-159709 A    9/2016
KR    2020-0048901 A   5/2020

OTHER PUBLICATIONS

International Search Report and Written Opinion mailed on Jun. 21, 2022, received for PCT Application PCT/JP2022/016656, filed on Mar. 31, 2022, 9 pages including English Translation.
(Continued)

*Primary Examiner* — Kerri L McNally
(74) *Attorney, Agent, or Firm* — XSENSUS LLP

(57) ABSTRACT

To accurately identify positions of preceding vehicles. A vehicle position identification apparatus having a controller, where the controller (a) acquires position data of each forward vehicle, each position data including a left side position and a right side position of each forward vehicle, and (b) for each position data at a first time and a second time, associates the left side position with a first axis and the right side position with a second axis and obtains a distance between each of the position data on coordinates, or obtains the amount of change in the left side position along the first axis and the amount of change in the right side position along the second axis, and based on the distance or each of the amount of change, identifies a correspondence relationship between each of the position data and each forward vehicle and generates data which indicates the correspondence relationship.

18 Claims, 8 Drawing Sheets

(58) Field of Classification Search
USPC .......................................................... 340/468
See application file for complete search history.

(56) References Cited

U.S. PATENT DOCUMENTS

| | | | |
|---|---|---|---|
| 2012/0253628 A1* | 10/2012 | Maruyama | B60W 50/085 |
| | | | 701/93 |
| 2013/0018547 A1 | 1/2013 | Ogata et al. | |
| 2013/0033600 A1* | 2/2013 | Higuchi | G06T 7/248 |
| | | | 348/148 |
| 2014/0355280 A1* | 12/2014 | Fujiyoshi | B60Q 1/143 |
| | | | 362/465 |
| 2017/0057508 A1* | 3/2017 | Tamura | G05D 1/0251 |
| 2019/0152378 A1* | 5/2019 | Kim | B60Q 1/143 |
| 2020/0254995 A1* | 8/2020 | Lee | G01S 13/87 |
| 2021/0046861 A1 | 2/2021 | Li et al. | |
| 2022/0136674 A1* | 5/2022 | Won | F21S 41/33 |
| | | | 362/466 |

OTHER PUBLICATIONS

Betke et al., "Real-time multiple vehicle detection and tracking from a moving vehicle", Machine Vision and Applications, vol. 12, Aug. 2000, pp. 69-83.

Extended European search report issued on Mar. 3, 2025, in corresponding European patent Application No. 22788081.2, 9 pages.

\* cited by examiner

| | COMMUNICATION ID:01 | COMMUNICATION ID:02 |
|---|---|---|
| (t-1) | (+5°, +1°) | (-3°, -7°) |
| (t) | (-2°, -6°) | (+6°, +2°) |
| ⋮ | ⋮ | ⋮ |

| | INTERNAL ID : 01 | INTERNAL ID : 02 |
|---|---|---|
| (t-1) | (+5°, +1°) | (-3°, -7°) |
| (t) | (+6°, +2°) | (-2°, -6°) |
| ⋮ | ⋮ | ⋮ |

VEHICLE POSITION IDENTIFICATION APPARATUS, VEHICLE POSITION IDENTIFICATION METHOD, LIGHT DISTRIBUTION CONTROLLER, VEHICLE LAMP SYSTEM

CROSS-REFERENCE TO RELATED APPLICATIONS

The present application is based on PCT filing PCT/JP2022/016656, filed Mar. 31, 2022, which claims priority to Japanese Patent Application No. 2021-069558, filed Apr. 16, 2021, the entire contents of each are incorporated herein by reference.

TECHNICAL FIELD

The present disclosure relates to a vehicle position identification apparatus, a vehicle position identification method, a light distribution controller, and a vehicle lamp system.

BACKGROUND ART

There is known a light distribution control technology that irradiates a high beam by setting a dimming range (or light shielding range) within the irradiation range of the high beam according to the positions of preceding vehicles and oncoming vehicles in front of an own vehicle. (Refer to Patent Document 1, for example.) The positions of the preceding vehicles or the like can be obtained, for example, by performing image recognition process on an image of the space in front of the own vehicle captured by a camera and detecting their light spots (positions of their headlights and taillights).

Here, when there are multiple preceding vehicles, etc. existing, it may not be possible to accurately identify the positions of the respective vehicles. Therefore, when performing light distribution control according to the positions of the preceding vehicles, etc., it has been necessary to expand the dimming range more than necessary in order to securely prevent glare (dazzle) to the preceding vehicles, etc.

PRIOR ART DOCUMENT

Patent Document

Patent Document 1: Japanese Unexamined Patent Application Publication No. 2015-58802

SUMMARY OF THE INVENTION

Technical Problem

In a specific aspect, it is an object of the present disclosure to provide a technology that enables to accurately identify the positions of preceding vehicles, etc.

Solution to the Problem (1) A vehicle position identification apparatus according to one aspect of the present disclosure is a vehicle position identification apparatus having a controller, where the controller (a) acquires a plurality of position data of each of a plurality of forward vehicles, each position data including a left side position and a right side position of each of the plurality of forward vehicles, and (b) for each of the position data at a first time and a second time, associates the left side position with a first axis and associates the right side position with a second axis and obtains a distance between each of the position data on coordinates, or alternatively, obtains the amount of change in the left side position along the first axis and the amount of change in the right side position along the second axis, and based on the distance or each of the amount of change, identifies a correspondence relationship between each of the plurality of position data and each of the plurality of forward vehicles and generates data which indicates the correspondence relationship.

(2) A vehicle position identification apparatus according to one aspect of the present disclosure is a vehicle position identification apparatus having a controller, where the controller includes: (a) a vehicle position acquisition unit that acquires a plurality of position data of each of a plurality of forward vehicles, each position data including a left side position and a right side position of each of the plurality of forward vehicles, and (b) a vehicle position identification unit where, for each of the position data at a first time and a second time, the vehicle position identification unit associates the left side position with a first axis and associates the right side position with a second axis and obtains a distance between each of the position data on coordinates, or alternatively, obtains the amount of change in the left side position along the first axis and the amount of change in the right side position along the second axis, and based on the distance or each of the amount of change, identifies a correspondence relationship between each of the plurality of position data and each of the plurality of forward vehicles and generates data which indicates the correspondence relationship.

(3) A vehicle position identification method according to one aspect of the present disclosure is a vehicle position identification method executed by a controller, where the method includes: (a) to acquire a plurality of position data of each of a plurality of forward vehicles, each position data including a left side position and a right side position of each of the plurality of forward vehicles, and (b) for each of the position data at a first time and a second time, to associate the left side position with a first axis and associate the right side position with a second axis and obtain a distance between each of the position data on coordinates, or alternatively, to obtain the amount of change in the left side position along the first axis and the amount of change in the right side position along the second axis, and based on the distance or each of the amount of change, identify a correspondence relationship between each of the plurality of position data and each of the plurality of forward vehicles and generate data which indicates the correspondence relationship.

(4) A light distribution controller according to one aspect of the present disclosure is a light distribution controller, where, based on the data indicating a correspondence relationship between each of the plurality of position data obtained by the vehicle position identification apparatus according to the above described (1) or (2) and each of the plurality of forward vehicles, the light distribution controller generates a control signal to execute light irradiation based on a light distribution pattern including a dimming range according to the positions of each of the plurality of forward vehicles, and provides the control signal to a vehicle lamp.

(5) A vehicle lamp system according to one aspect of the present disclosure is a vehicle lamp system including the light distribution controller according to the above described (4) and a vehicle lamp that operates by receiving the control signal provided from the light distribution controller.

According to the above configurations, it is possible to accurately identify the positions of preceding vehicles, etc. Further, it is possible to perform suitable light irradiation according to their identified positions.

MODE FOR CARRYING OUT THE INVENTION

Figure 1A:
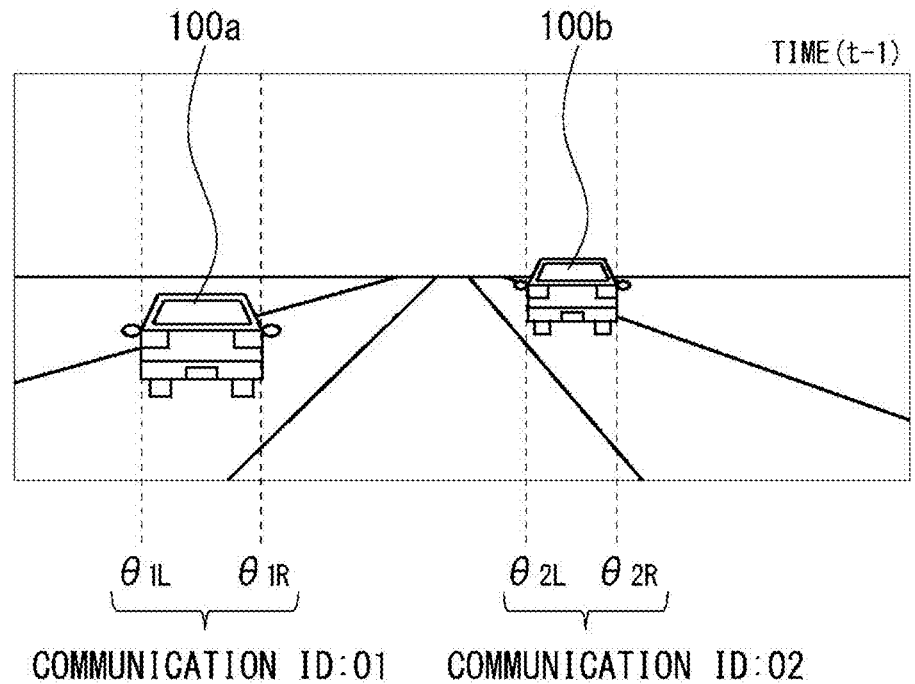
FIGS. 1A and 1B are diagrams for explaining the detection state of the positions of forward vehicles assumed by the present embodiment.
Figure 1B:
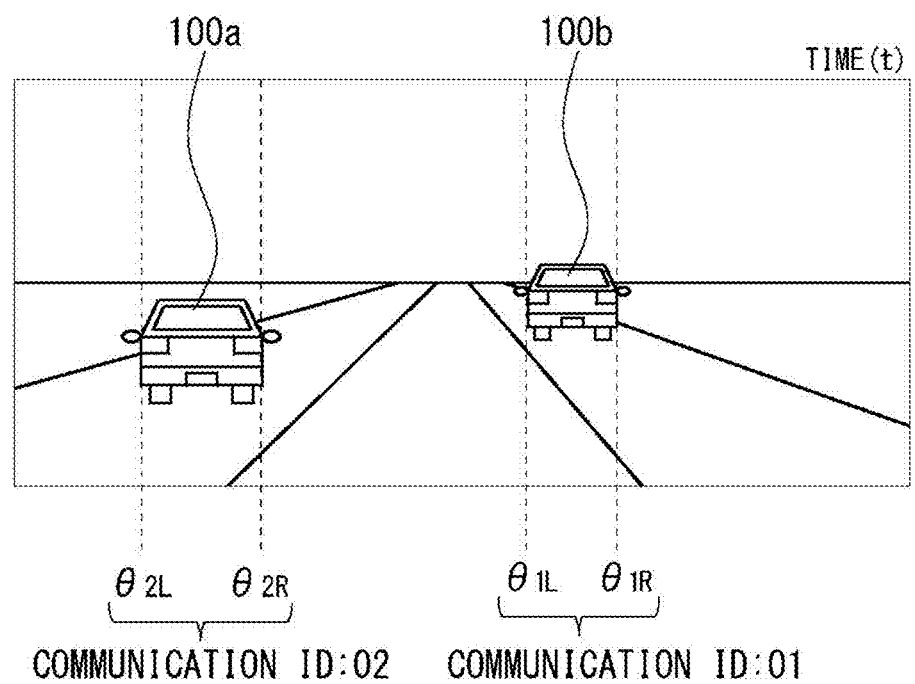

FIGS. 1A and 1B are diagrams for explaining the detection state of the positions of forward vehicles assumed by the present embodiment. In this specification, the term "forward vehicle" refers to a preceding vehicle or an oncoming vehicle, and in these diagrams, a case where each vehicle is a preceding vehicle are shown. In this embodiment, it is assumed that the position data of the forward vehicles 100a and 100b are each detected by a detecting means at an angle based on the traveling direction of the own vehicle.

As shown in FIG. 1A, at a certain time (t-1), angles $\theta_{1L}$ and $\theta_{1R}$ which respectively corresponds to the left and right positions of the forward vehicle 100a are detected as the position data of the forward vehicle 100a, and as identification information for distinguishing each vehicle, communication ID "01" is linked thereto and output from the detecting means. Further, angles $\theta_{2L}$, and $\theta_{2R}$ which respectively corresponds to the left and right positions of the forward vehicle 100b are detected as the position data of the forward vehicle 100b, and as identification information for distinguishing each vehicle, communication ID "02" is linked thereto and output from the detecting means.

Similarly, the position data of the forward vehicles 100a and 100b are detected every predetermined time. However, the detecting means does not distinguish between the forward vehicles 100a and 100b. Therefore, depending on the situation, as shown in FIG. 1B, at a certain time (t), the forward vehicle 100b may be associated with communication ID "01", and $\theta_{1L}$ and $\theta_{1R}$ are detected as the angles which correspond to the left and right positions thereof and output from the detecting means, and the forward vehicle 100a may be associated with communication ID "02", and $\theta_{2L}$ and $\theta_{2R}$ are detected as the angles which correspond to the left and right positions thereof and output from the detecting means. That is, the communication ID attached to the position data does not necessarily uniquely correspond to each forward vehicle.

That is, a situation may arise in which the forward vehicle which corresponds to a communication ID is randomly replaced, and the continuity of the position data is not maintained. Therefore, when performing light distribution control, it may be necessary to set an algorithm on the premise that forward vehicles identified by communication IDs are randomly replaced. Thus, in order to reliably suppress the glare to the forward vehicles, for example, for all the forward vehicles being detected, it is necessary to set the dimming range between the leftmost position and the rightmost position of each forward vehicle. Alternatively, when the preceding vehicle and the oncoming vehicle can be distinguished, it is necessary to set the dimming range in a range including all preceding vehicles and a range including all oncoming vehicles. Further, when performing control while predicting the lateral movement of each forward vehicle, it may be difficult to do so. For example, it is conceivable to perform control such as expanding the dimming range in accordance with the predicted moving direction of the forward vehicles.

On the other hand, even if the correspondence relationship between the position data of each forward vehicle obtained by the detecting means and the communication ID is randomly replaced, if it is possible to distinguish each forward vehicle and accurately identify the position data of each forward vehicle, and further use the result to perform light distribution control, it becomes unnecessary to set an excessively wide dimming range. In the following, an embodiment for achieving this will be described. Here, in this specification, the term. "dimming" refers to setting brightness (illuminance, luminance, etc.) relatively low during light irradiation, and is a concept including a case where brightness is substantially 0 (non-irradiation).

Figure 2:
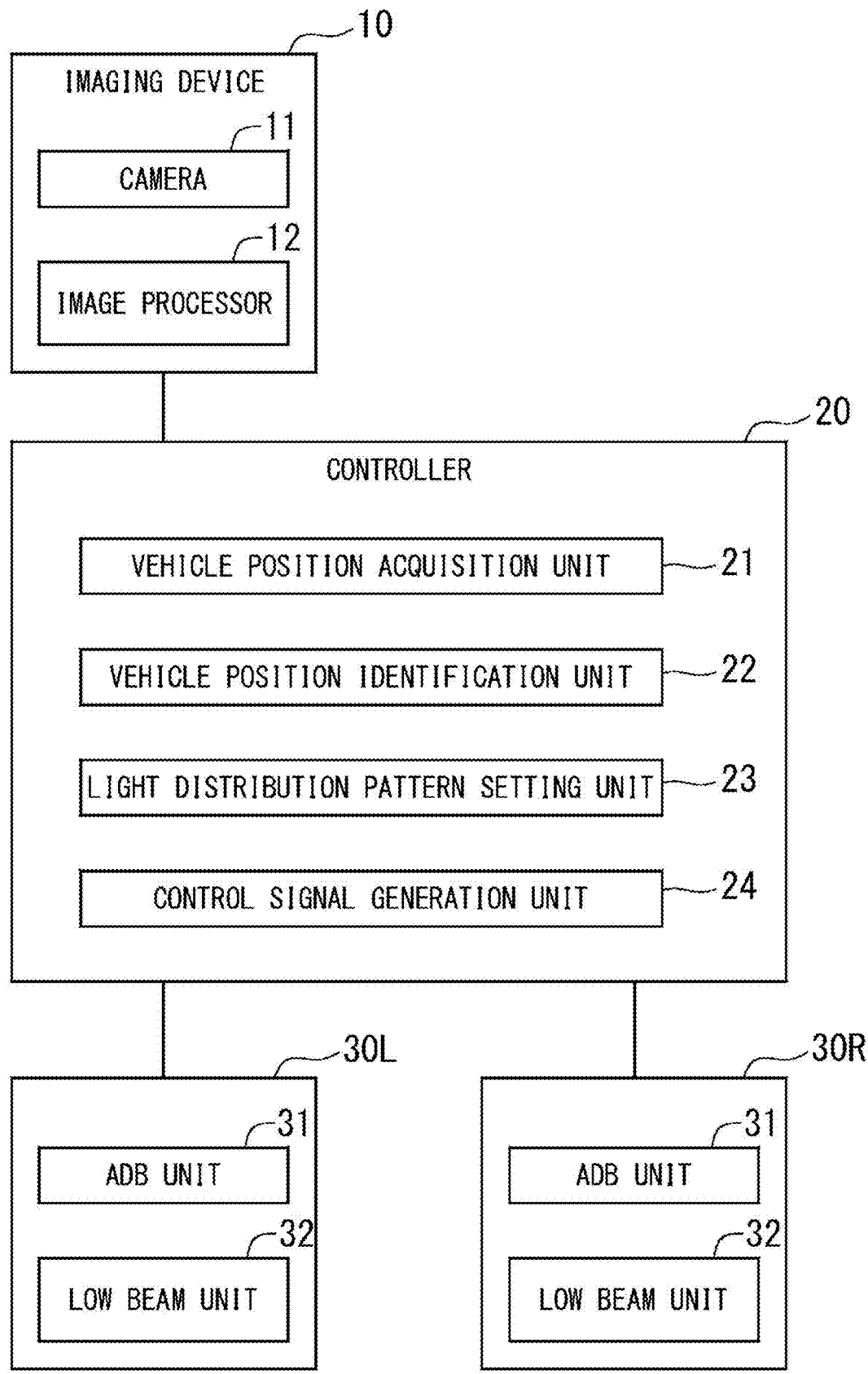
FIG. 2 is a diagram showing the configuration of a vehicle lamp system according to one embodiment.

FIG. 2 is a diagram showing the configuration of a vehicle lamp system according to one embodiment. The vehicle lighting system shown in the figure irradiates light to the space around the own vehicle (here, in front of the own vehicle), and within a so-called high-beam irradiation range, the system performs selective light irradiation which sets a dimming range according to the positions of the forward vehicles and a light irradiation range which is a range other than the dimming range. Such light distribution control is also referred to as ADB (Adaptive Driving Beam) control, and contributes to improved visibility around the own vehicle. The vehicle lamp system is configured to include an imaging device 10, a controller 20, and a pair of headlight units (vehicle lamps) 30L and 30R. The imaging device 10 and the controller 20 are connected by a predetermined communication means. Further, the controller 20 and the headlight units 30L and 30R are connected via predetermined wirings. Here, in this embodiment, the imaging device 10 and the controller 20 correspond to the "vehicle position identification apparatus" and also the "light distribution controller".

The imaging device 10 includes a camera 11 and an image processor 12, and based on an image captured by the camera 11, the image processor 12 performs predetermined image processing to detect a forward vehicle present in front of the own vehicle. In this embodiment, as the position of each forward vehicle, the imaging device 10 detects the left side position and the right side position of each forward vehicle. The left side position and the right side position referred to here correspond to the positions of the taillights when the vehicle in front is a preceding vehicle, and correspond to the positions of the headlights when the vehicle in front is an oncoming vehicle. The position data of the forward vehicle is represented by an angle relative to the own vehicle position. Further, when there are a plurality of forward vehicles as described above, the position data (or signals) are output to the controller 20 with a communication ID assigned to each forward vehicle.

The controller 20 identifies the position of each forward vehicle based on the position data of each forward vehicle output from the imaging device 10, and according to the identified position, the controller 20 sets a light distribution pattern including a dimming range and a light irradiation range corresponding to each forward vehicle, and controls the headlight units 30L and 30R so that light irradiation is performed according to the light distribution pattern. The controller 20 is realized by using a computer having, for example, a CPU (Central Processing Unit), a ROM (Read Only Memory), a RAM (Random Access Memory), etc., and by having the computer execute a predetermined operation program. In order to facilitate understanding of the function realized by the controller 20, functional blocks will be used for explanation. The controller 20 has, as functional blocks, a vehicle position acquisition unit 21, a vehicle position identification unit 22, a light distribution pattern setting unit 23, and a control signal generation unit 24.

The vehicle position acquisition unit 21 acquires position data (or signals) of the forward vehicles output from the imaging device 10. As described above, the position data of each forward vehicle is associated with a communication ID in order to distinguish each forward vehicle and is output in chronological order every predetermined time (for example, every 50 milliseconds).

The vehicle position identification unit 22 identifies the actual position of each forward vehicle based on the position data of each forward vehicle acquired by the vehicle position acquisition unit 21. A specific identification method is to be described later.

The light distribution pattern setting unit 23 sets a light distribution pattern which corresponds to the position of each forward vehicle identified by the vehicle position identification unit 22. The light distribution pattern is set within a high beam irradiation range in which the pattern includes a dimming range which is a predetermined range including the position of each forward vehicle and a light irradiation range which is a range other than the dimming range.

The control signal generation unit 24 generates a control signal corresponding to the light distribution pattern set by the light distribution pattern setting unit 23 and provides the control signal to each of the headlight units 30L and 30R.

Each of the headlight units 30L and 30R operates according to the control signal provided from the controller 20 to irradiate light forward of the own vehicle, and has an ADB unit 31 and a low beam unit 32.

The ADB unit 31 is a lamp unit capable of selectively irradiating light according to the positions of the forward vehicles within a high beam irradiation range. As such ADB unit 31, various known units can be used, for example, one that forms irradiation light by combining a light source and a liquid crystal element, one that forms irradiation light by individually turning on and off a plurality of light emitting elements (LEDs), one that forms irradiation light by scanning light emitted from a laser element with a MEMS device or the like, or one that forms irradiation light by partially shielding light from a light source using a shielding plate (a shade).

The low beam unit 32 is a lamp unit capable of irradiating light toward an area relatively closer to the own vehicle than the high beam unit. As such low beam unit 32, various known units can be used. Here, the low beam unit may be formed by a unit having both the function of the low beam unit 32 and the function of the ADB unit 31.

Figure 3:
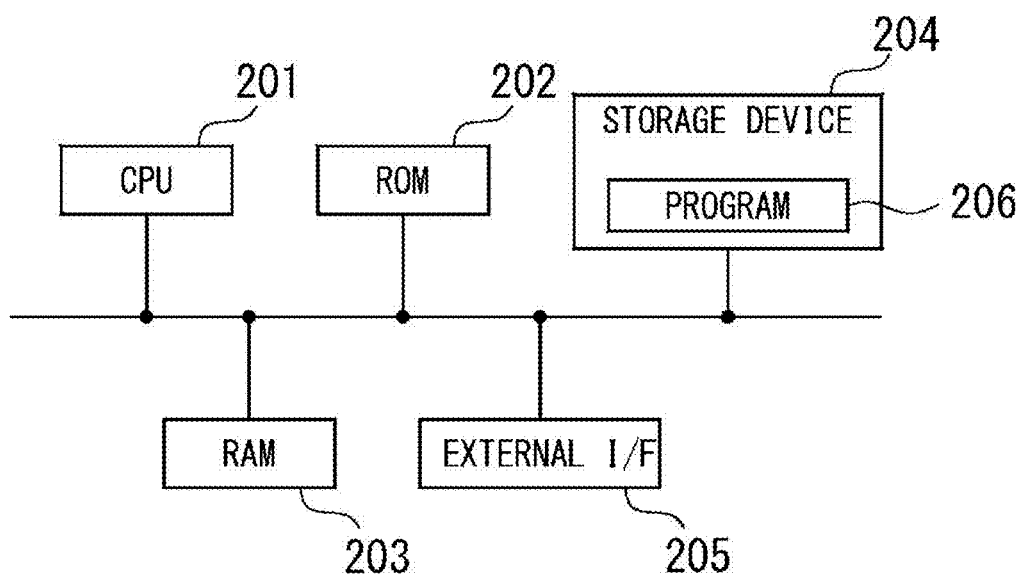
FIG. 3 is a diagram showing a configuration example of a computer that realizes a controller.

FIG. 3 is a diagram showing a configuration example of a computer that realizes a controller. The illustrated computer is configured to include a CPU 201, a ROM 202, a RAM 203, a storage device 204, and an external interface (I/F) 205 that are communicably connected to one another. The CPU 201 operates based on a basic control program read from the ROM 202, reads a program (an application program) 206 stored in the storage device 204, and executes the program, thereby realizes the functions of the controller 20 described above. The RAM 203 temporarily stores data to be used when the CPU 201 is operating. The storage device 204 is a nonvolatile storage device such as a hard disk or solid state drive, and stores various data such as the program 206. The external interface 205 is an interface that connects the CPU 201 and an external device, and for example, is used to connect the imaging device 10 and the CPU 201.

Figure 4A:
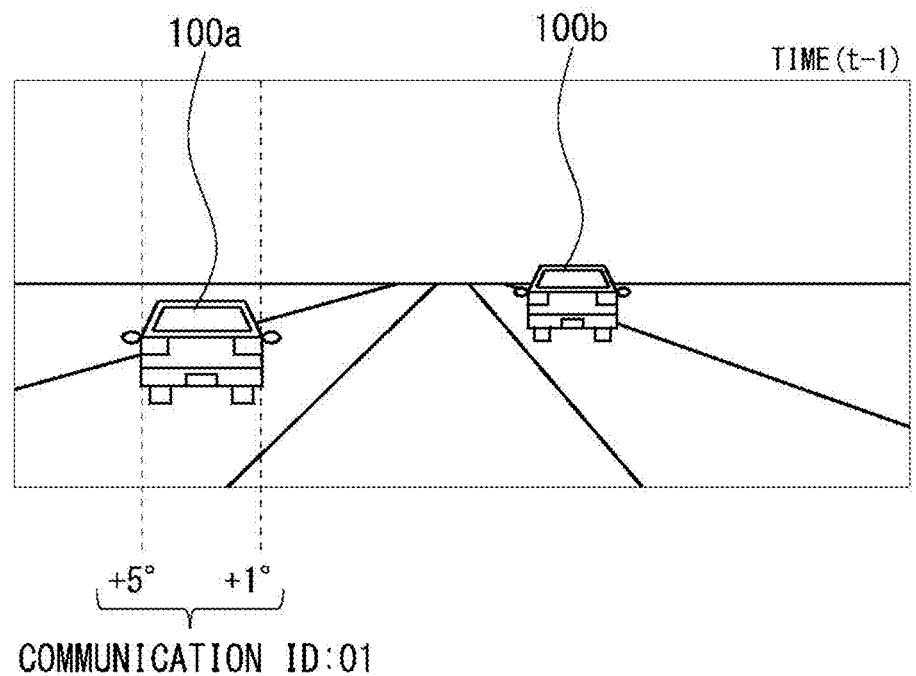
FIGS. 4A and 4B are diagrams for explaining an example of a detection result of the positions of the forward vehicles performed by the imaging device 10.
Figure 4B:
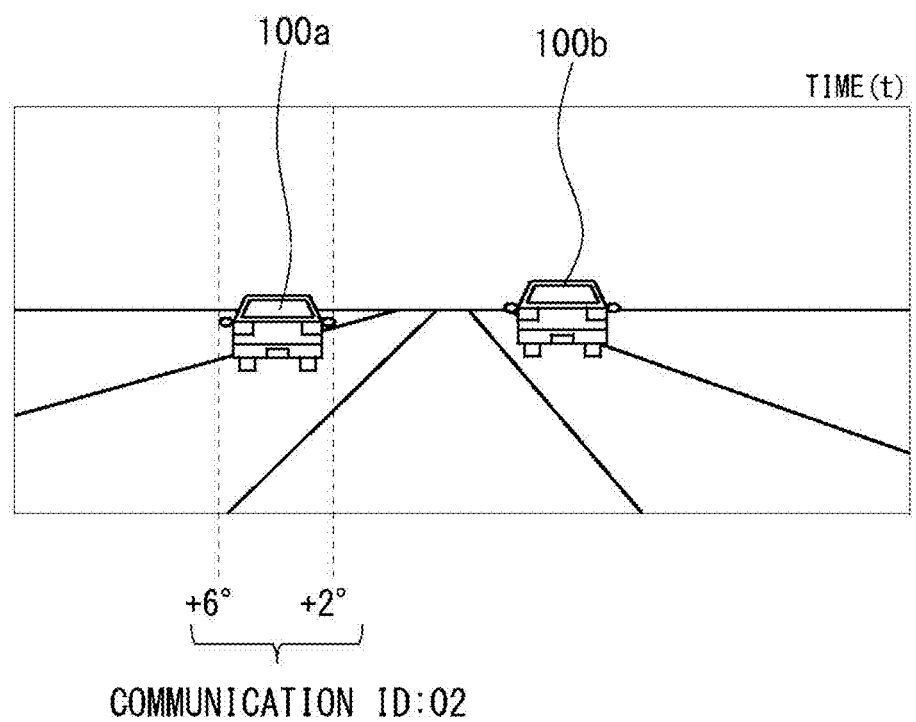
Figure 5A:
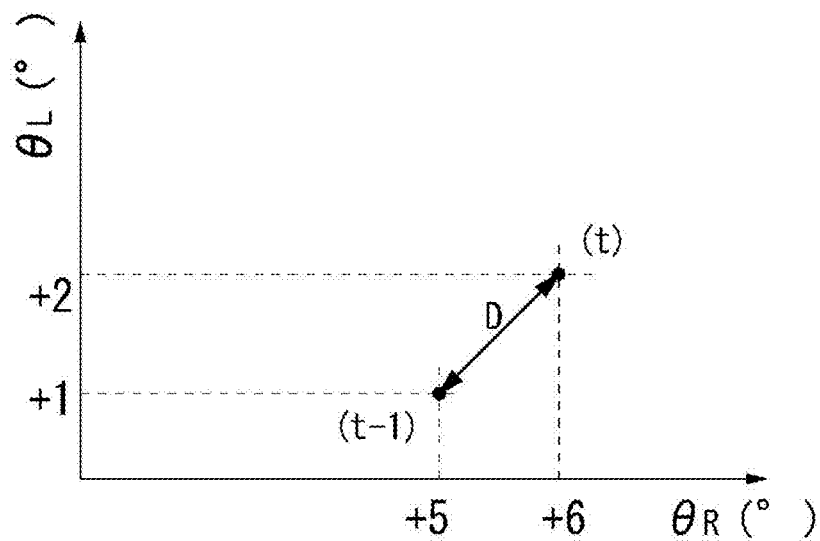
FIGS. 5A and 5B are diagrams for explaining the principle of identifying vehicle positions by the vehicle position identification unit 22.
Figure 5B:
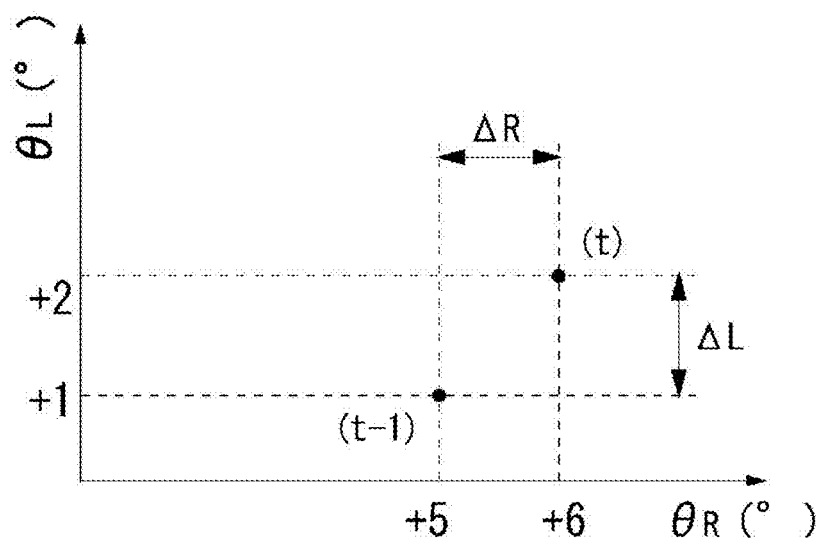

FIGS. 4A and 4B are diagrams for explaining an example of a detection result of the positions of the forward vehicles performed by the imaging device 10. Further, FIGS. 5A and 5B are diagrams for explaining the principle of identifying vehicle positions by the vehicle position identification unit 22. As shown in FIGS. 4A and 4B, consider a case where, at first time (t-1), position data of forward vehicle 100a is associated with communication ID "01" and output as "$\theta_{1L}=+5°$, $\theta_{1R}=+1°$", and nextly, at second time (t), position data of the forward vehicle 100a is associated with communication ID "02" and output as "$\theta_{2L}=+6°$, $\theta_{2R}=+2°$". Here, although details are omitted, with regard to forward vehicle 100b, it is assumed that the forward vehicle 100b is associated with communication ID "02" at time (t-1), and is associated with communication ID "01" at time (t), and its position is outputted.

As shown in FIG. 5A, the left side position $\theta_L$ of a forward vehicle is associated with a vertical axis (first axis) and the right side position $\theta_R$ is associated with a horizontal axis (second axis), then the position of the forward vehicle 100a at time (t-1) and (t) is plotted respectively, and distance D (Euclidean distance) between the plotted points on coordinates is obtained. When the distance D is less than or equal to a predetermined reference value, it is assumed that the position data corresponding to these plots correspond to the same forward vehicle. Such process is performed in round robin for the position data corresponding to each communication ID at time (t-1) and (t). As a result, in the illustrated example, it can be identified that the position data corresponding to communication ID "01" at time (t-1) and the position data corresponding to communication ID "02" at time (t) are those of the same forward vehicle 100a. Similarly, in the illustrated example, it can be identified that the position data corresponding to communication ID "02" at time (t-1) and the position data corresponding to communication ID "01" at time (t) are those of the same forward vehicle 100b.

The reference value for the distance D may be appropriately set based on simulation results or actual measurement results, and for example, when the position data is updated and output every 0.05 seconds and the unit of angle is "degree", it is desirable to set the reference value to 4-8. Further, the reference value may be set to a different value depending on whether the forward vehicle is a preceding vehicle or an oncoming vehicle.

Figure 6:
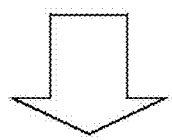
FIG. 6 is a conceptual diagram showing a process which identifies position data.

According to this process, even when a forward vehicle identified by the communication ID and the actual forward vehicle are replaced with each other, the correspondence relationship between the position data and the forward vehicle can be identified. For example, as shown in a conceptual diagram of FIG. 6, assuming that the controller 20 uses an internal ID for identifying each forward vehicle, even when the communication IDs are replaced with each other, data for internal processing is generated in which the position data of the forward vehicle 100*a* is associated with the internal ID "01" and the position data of the forward vehicle 100*b* is associated with the internal ID "02".

Here, instead of using Euclidean distance, as shown in FIG. 5B, for each of $\theta_L$ and $\theta_R$, one may obtain amount of change ΔL and ΔR in directions along each axis between time (t-1) and time (t), and if all of these amount of change are equal to or less than a predetermined reference value, their position data may be identified as belonging to the same forward vehicle.

Figure 7:
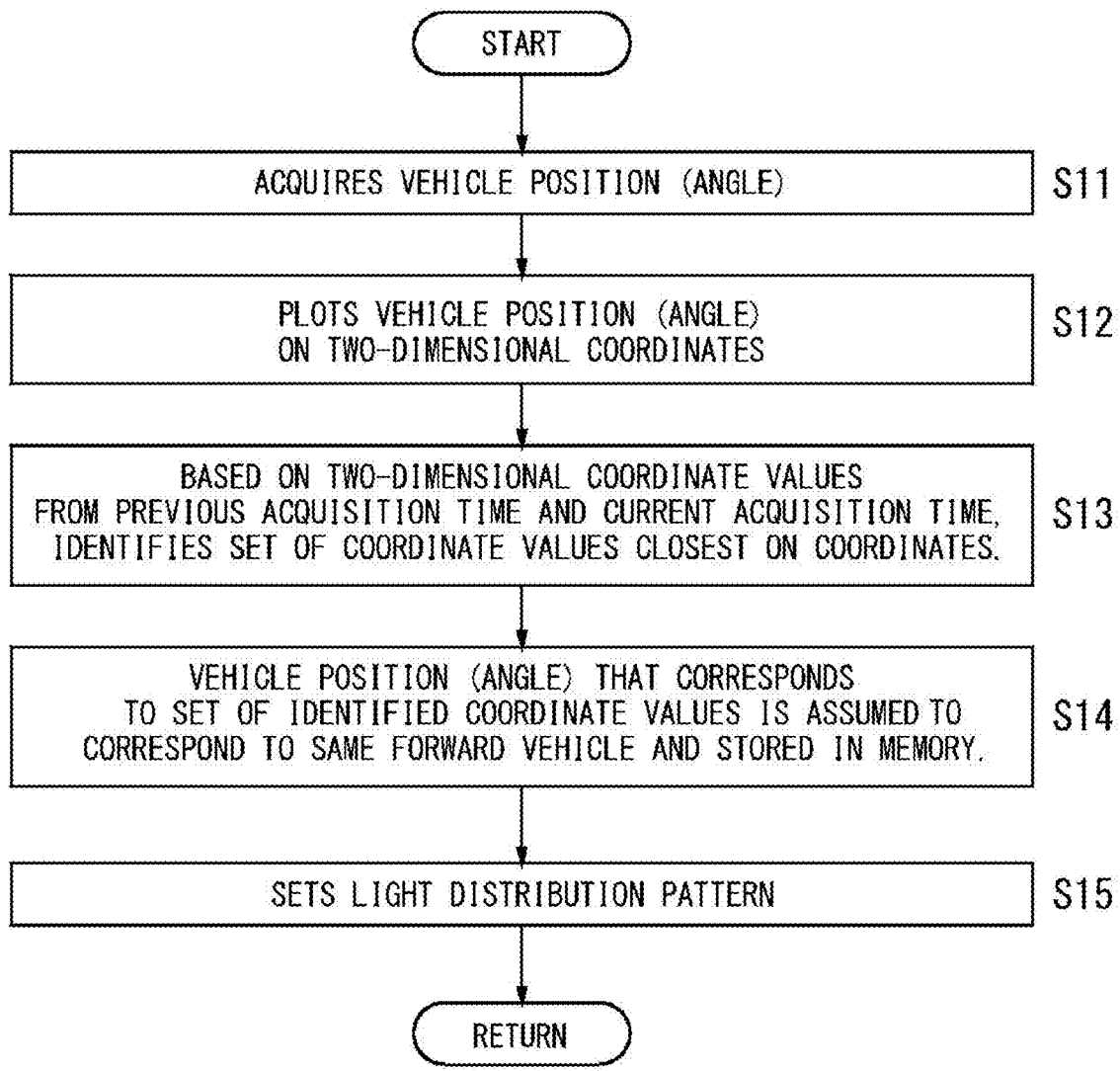
FIG. 7 is a flowchart showing the operation procedure of the controller of the vehicle lamp system.

FIG. 7 is a flowchart showing the operation procedure of the controller of the vehicle lamp system. Here, it should be noted that the order of the illustrated processing blocks may be changed as long as there is no contradiction or inconsistency in the information processing results, or other processing blocks which is not illustrated may be added, and such embodiments are not excluded.

The vehicle position acquisition unit 21 acquires position data (angle) of each forward vehicle from the imaging device 10 (step S11). Here, it is assumed that the position data of each forward vehicle is output from the imaging device 10 at predetermined intervals (for example, every 0.05 seconds).

The vehicle position identification unit 22 plots the acquired position data on two-dimensional coordinates (step S12), and based on the distance D between the plot positions at the previous acquisition time (first time) and the current acquisition time (second time), identifies a set of coordinate values whose distance D is less than or equal to the reference value and whose distance D is the shortest and closest on the coordinates (step S13). Here, it should be noted that, at the time of initial processing such as immediately after start of operation, when position data obtained at a previous acquisition time does not exist, appropriate measures should be taken based on common technical knowledge, such as perform processing using a predetermined fixed value, or not to perform processing until the next position data is obtained.

Next, the vehicle position identification unit 22 generates data indicating a correspondence relationship assuming that the vehicle position that corresponds to the set of coordinate values identified in step S13 corresponds to the same forward vehicle (refer to FIG. 6), and stores the data in a memory which is not shown (step S14).

Next, the light distribution pattern setting unit 23 sets a light distribution pattern including a dimming range and a light irradiation range according to the position of each forward vehicle identified by the vehicle position identification unit 22 (step S15). A control signal based on the established light distribution pattern is generated by the control signal generation unit 24 and output to each of the headlight units 30L and 30R, thereby performing light irradiation according to the positions of the forward vehicles. Then, the process returns to step S11.

Figure 8:
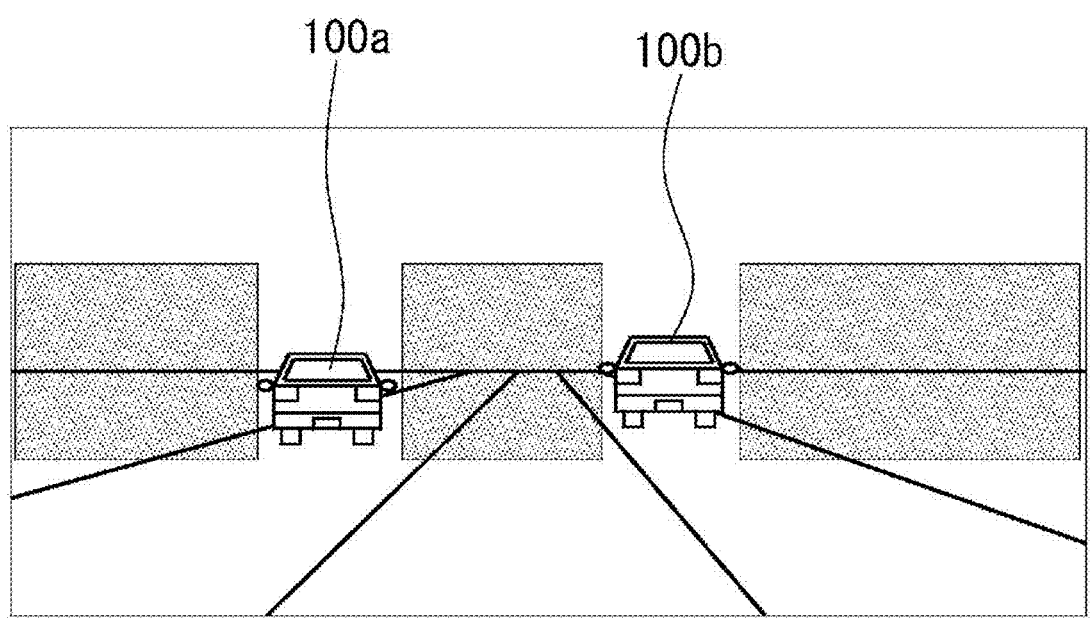
FIG. 8 is a diagram showing an example of light distribution control.

FIG. 8 is a diagram showing an example of light distribution control. In the diagram, the patterned portions are where light irradiation is performed. Note that illustration of low beam is omitted. As shown in the diagram, it is possible to realize light irradiation in which the dimming range is set according to the positions of each of the forward vehicles 100*a* and 100*b*.

According to the above embodiment, it is possible to accurately identify the positions of preceding vehicles, etc. Further, it is possible to perform suitable light irradiation according to their identified positions.

Here, it should be noted that the present disclosure is not limited to the content of the above-described embodiment, and can be implemented in various modifications within the scope of the gist of the present disclosure. For example, in the above-described embodiment, it is assumed that position data of a forward vehicle is obtained by use of an angle, but the position of a forward vehicle may be obtained by use of coordinate values which assumes an axis corresponding to the lateral direction of the own vehicle. In this case, the left and right positions of the forward vehicle may be expressed as coordinate values on the coordinate system in which the original point of the axis is being set at an appropriate position (for example, the position of the own vehicle).

Further, in the above-described embodiment, a case where detecting the positions of the forward vehicles based on the image in front of the own vehicle has been exemplified, but in order to detect the positions of the forward vehicles, a sensor using a laser beam such as LiDAR (Light Detection and Ranging) or a sensor using an ultrasonic wave may also be used to detect the positions of the forward vehicles, or the positions of the forward vehicles may be detected by vehicle-to-vehicle communication or road-to-vehicle communication (so-called V2X).

Further, in the above-described embodiment, the forward vehicles have been identified based on the lateral positions of the vehicles, however, the type of forward vehicles or the distance between the forward vehicles and the own vehicle may also be considered. For example, in a case where data indicating forward vehicle type (preceding vehicle/oncoming vehicle) is output from the imaging device 10, after distinguishing the forward vehicles by its type, for each type, in the same manner as the above-described embodiment, the vehicles may be identified. Further, for example, in a case where data indicating the distance between the forward vehicle and the own vehicle is output from the imaging device 10, the data having a smaller distance change amount may be identified as the same vehicle. Thus, even if the Euclidean distances become the same for a plurality of forward vehicles, it is possible to identify the vehicle. Here, the distance between the forward vehicle and the own vehicle may be detected by another radar or the like, or may be detected by the controller 20 based on the size of the forward vehicle displayed in the image.

10: Imaging device
11: Camera
12: Image processor
20: Controller
21: Vehicle position acquisition unit
22: Vehicle position identification unit
23: Light distribution pattern setting unit
24: Control signal generation unit
30L,30R: Headlight unit
31: ADB unit
32: Low beam unit

The invention claimed is:

1. A vehicle position identification apparatus having a controller,
wherein the controller acquires a plurality of position data of each of a plurality of forward vehicles, each position data including a left side position and a right side position of each of the plurality of forward vehicles, and
for each of the position data at a first time and a second time, associates the left side position with a first axis and associates the right side position with a second axis and obtains a distance between each of the position data on coordinates, or alternatively, obtains the amount of change in the left side position along the first axis and the amount of change in the right side position along the second axis, and based on the distance or each of the amount of change, identifies a correspondence relationship between each of the plurality of position data and each of the plurality of forward vehicles and generates data which indicates the correspondence relationship.

2. A vehicle position identification apparatus having a controller,
wherein the controller comprises:
a vehicle position acquisition unit that acquires a plurality of position data of each of a plurality of forward vehicles, each position data including a left side position and a right side position of each of the plurality of forward vehicles, and
a vehicle position identification unit where, for each of the position data at a first time and a second time, the vehicle position identification unit associates the left side position with a first axis and associates the right side position with a second axis and obtains a distance between each of the position data on coordinates, or alternatively, obtains the amount of change in the left side position along the first axis and the amount of change in the right side position along the second axis, and based on the distance or each of the amount of change, identifies a correspondence relationship between each of the plurality of position data and each of the plurality of forward vehicles and generates data which indicates the correspondence relationship.

3. The vehicle position identification apparatus according to claim 1,
wherein an identification information is attached to each of the plurality of position data, and
wherein each of the identification information does not uniquely correspond to each of the plurality of forward vehicles.

4. The vehicle position identification apparatus according to claim 1,
wherein each of the position data which corresponds to the distance or the amount of change is associated with the same forward vehicle when the distance is less than or equal to a predetermined reference value or the amount of change is less than or equal to a predetermined reference value.

5. The vehicle position identification apparatus according to claim 4,
wherein each of the position data which corresponds to the distance or the amount of change is associated with the same forward vehicle when the distance is less than or equal to a predetermined reference value and is the smallest, or when the amount of change is less than or equal to a predetermined reference value and is the smallest.

6. The vehicle position identification apparatus according to claim 1,
wherein the left side position and the right side position in each of the position data are respectively represented by an angle.

7. A vehicle position identification method executed by a controller,
wherein the method comprises:
to acquire a plurality of position data of each of a plurality of forward vehicles, each position data including a left side position and a right side position of each of the plurality of forward vehicles, and
for each of the position data at a first time and a second time, to associate the left side position with a first axis and associate the right side position with a second axis and obtain a distance between each of the position data on coordinates, or alternatively, to obtain the amount of change in the left side position along the first axis and the amount of change in the right side position along the second axis, and based on the distance or each of the amount of change, identify a correspondence relationship between each of the plurality of position data and each of the plurality of forward vehicles and generate data which indicates the correspondence relationship.

8. A vehicle lamp system, comprising:
the vehicle position identification apparatus according to claim 1;
a vehicle lamp that irradiates light ahead of an own vehicle; and
a light distribution controller that supplies a control signal to the vehicle lamp,
wherein, based on the data indicating a correspondence relationship between each of the plurality of position data obtained by the vehicle position identification apparatus according to claim 1 and each of the plurality of forward vehicles, the light distribution controller generates a control signal to execute light irradiation based on a light distribution pattern including a dimming range according to the positions of each of the plurality of forward vehicles, and provides the control signal to the vehicle lamp.

9. The vehicle lamp system according to claim 8, wherein based on the control signal, the vehicle lamp is configured to selectively irradiate light in accordance with the position of the forward vehicle within a high-beam irradiation range.

10. The vehicle lamp system according to claim 8, wherein the vehicle position identification apparatus further comprises an imaging device that detects the position of the forward vehicle by performing predetermined image processing based on a captured image.

11. The vehicle lamp system according to claim 8, wherein the vehicle position identification apparatus further comprises a sensor that detects the position of the forward vehicle using a laser beam or an ultrasonic wave.

12. A vehicle lamp system comprising:
the vehicle position identification apparatus according to claim 2;
a vehicle lamp that irradiates light ahead of an own vehicle; and
a light distribution controller that supplies a control signal to the vehicle lamp,
wherein the light distribution controller includes a light distribution pattern setting unit that sets a light distribution pattern which includes a light dimming range and a light irradiation range according to the position of each of the forward vehicles identified by the vehicle position identification apparatus.

13. A vehicle lamp system comprising:
the vehicle position identification apparatus according to claim 2;
a vehicle lamp that irradiates light ahead of an own vehicle; and
a light distribution controller that supplies a control signal to the vehicle lamp,
wherein an identification information is attached to each of the plurality of position data, and wherein each of the identification information does not uniquely correspond to each of the plurality of forward vehicles.

14. A vehicle lamp system comprising:
the vehicle position identification apparatus according to claim 2;
a vehicle lamp that irradiates light ahead of an own vehicle; and
a light distribution controller that supplies a control signal to the vehicle lamp,
wherein each of the position data which corresponds to the distance or the amount of change is associated with the same forward vehicle when the distance is less than or equal to a predetermined reference value or the amount of change is less than or equal to a predetermined reference value.

15. The vehicle lamp system according to claim 14, wherein each of the position data which corresponds to the distance or the amount of change is associated with the same forward vehicle when the distance is less than or equal to a predetermined reference value and is the smallest, or when the amount of change is less than or equal to a predetermined reference value and is the smallest.

16. The vehicle lamp system according to claim 12, wherein an identification information is attached to each of the plurality of position data, and wherein each of the identification information does not uniquely correspond to each of the plurality of forward vehicles.

17. The vehicle lamp system according to claim 12, wherein each of the position data which corresponds to the distance or the amount of change is associated with the same forward vehicle when the distance is less than or equal to a predetermined reference value or the amount of change is less than or equal to a predetermined reference value.

18. The vehicle lamp system according to claim 17, wherein each of the position data which corresponds to the distance or the amount of change is associated with the same forward vehicle when the distance is less than or equal to a predetermined reference value and is the smallest, or when the amount of change is less than or equal to a predetermined reference value and is the smallest.

* * * * *